US007720148B2

(12) United States Patent
Au et al.

(10) Patent No.: US 7,720,148 B2
(45) Date of Patent: May 18, 2010

(54) EFFICIENT MULTI-FRAME MOTION ESTIMATION FOR VIDEO COMPRESSION

(75) Inventors: Oscar Chi-Lim Au, Kowloon (HK); Andy Chang, Hong Kong (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 1454 days.

(21) Appl. No.: 11/090,373

(22) Filed: Mar. 25, 2005

(65) Prior Publication Data
US 2005/0243921 A1 Nov. 3, 2005

Related U.S. Application Data

(60) Provisional application No. 60/556,363, filed on Mar. 26, 2004.

(51) Int. Cl.
*H04N 7/12* (2006.01)
(52) U.S. Cl. .............. 375/240.12; 375/240.17; 375/240.13; 375/240.16
(58) Field of Classification Search ........... 375/240.12, 375/240.16
See application file for complete search history.

(56) References Cited
U.S. PATENT DOCUMENTS

| 5,587,741 A | * | 12/1996 | Kim | 375/240.17 |
| 5,614,959 A | * | 3/1997 | Jeong et al. | 348/699 |
| 5,719,630 A | * | 2/1998 | Senda | 375/240.17 |
| 5,751,893 A | * | 5/1998 | Shimoda et al. | 386/111 |
| 5,781,249 A | * | 7/1998 | Hwang | 348/699 |
| 5,805,228 A | * | 9/1998 | Proctor et al. | 375/240.22 |
| 6,859,494 B2 | * | 2/2005 | Panusopone et al. | 375/240.16 |

OTHER PUBLICATIONS

Joint Video Team (JVT) of ISO/IEC MPEG and ITU-T VCEG, "Editor's Proposed Draft Text Modifications for Joint Video Specification (ITU-T Recommend. H.264 | ISO/IEC 14496-10 AVC), Draft 2," Document JVT-E022d2, Sep. 2002, pp. i-xv; 1-195.
Girod, B., "Efficiency Analysis of Multihypothesis Motion-Compensated Prediction for Video Coding," IEEE Transactions on Image Processing, vol. 9, No. 2, Feb. 2002, pp. 173-183.
Tourapis, et al., "Predictive Motion Vector Field Adaptive Search Technique (PMVFAST)-Enhancing Block Based Motion Estimation," Proc. of Visual Communications and Image Processing, Jan. 2001, pp. 883-892.

(Continued)

Primary Examiner—Tung Vo
Assistant Examiner—Anner Holder
(74) Attorney, Agent, or Firm—Schwabe Williamson & Wyatt

(57) ABSTRACT

There is disclosed a method of digital signal compression, coding and representation, and more particularly a method of video compression, coding and representation system that uses multi-frame motion estimation and includes both device and method aspects. The invention also provides a computer program product, such as a recording medium, carrying program instructions readable by a computing device to cause the computing device to carry out a method according to the invention.

51 Claims, 4 Drawing Sheets

OTHER PUBLICATIONS

Hepper, D., "Efficiency Analysis and Application of Uncovered Background Prediction in a Low Bit Rate Image Coder," IEEE Transactions on Communications, vol. 38, No. 9, Sep. 1990, pp. 1578-1584.

Topiwala, et al., "Performance Evaluation of H.26L, TML 8 vs. H.263++ and MPEG-4," ITU—Telecommunications Standardization Sector, Document VCEG-N18, Sep. 2001 (7 pages).

Topiwala et al., "Overview and Performance Evaluation of the ITU-T Draft H.26L Video Coding Stanrdard," Proc. SPIE, Appl. of Digital Image Processng, Aug. 2001 (16 pages).

Joch, et al., "Performance analysis of H.26L coding features," ITU—Telecommunications Standardization Sector, Document VCEG-O42, Nov. 2001 (9 pages).

* cited by examiner

EFFICIENT MULTI-FRAME MOTION ESTIMATION FOR VIDEO COMPRESSION

CROSS-REFERENCE TO RELATED APPLICATIONS

This application claims the benefit of U.S. Provisional Application No. 60/556,363, filed Mar. 26, 2004, which is hereby incorporated herein by reference in its entirety.

FIELD OF INVENTION

This invention relates generally to digital signal compression, coding and representation, and more particularly to a video compression, coding and representation system using multi-frame motion estimation and having both device and method aspects. It further relates to a computer program product, such as a recording medium, carrying program instructions readable by a computing device to cause the computing device to carry out a method according to the invention.

BACKGROUND OF THE INVENTION

Due to the huge size of the raw digital video data (or image sequences), compression must be applied such data so that they may be transmitted and stored. There have been many important video compression standards, including the ISO/IEC MPEG-1, MPEG-2, MPEG-4 standards and the ITU-T H.261, H.263, H.263+, H.263++, H.264 standards. The ISO/IEC MPEG-1/2/4 standards are used extensively by the entertainment industry to distribute movies, digital video broadcast including video compact disk or VCD (MPEG-1), digital video disk or digital versatile disk or DVD (MPEG-2), recordable DVD (MPEG-2), digital video broadcast or DVB (MPEG-2), video-on-demand or VOD (MPEG-2), high definition television or HDTV in the US (MPEG-2), etc. The later MPEG-4 was more advanced than MPEG-2 and can achieve high quality video at lower bit rate, making it very suitable for video streaming over internet, digital wireless network (e.g. 3G network), multimedia messaging service (MMS standard from 3GPP), etc. MPEG-4 will be included in the next generation DVD players. The ITU-T H.261/3/4 standards are designed for low-delay video phone and video conferencing systems. The early H.261 was designed to operate at bit rates of p*64 kbit/s, with p=1,2, . . . , 31. The later H.263 is very successful and is widely used in modern day video conferencing systems, and in video streaming in broadband and in wireless network, including the multimedia messaging service (MMS) in 2.5G and 3G networks and beyond. The latest H.264 (also called MPEG-4 Version 10, or MPEG-4 AVC) is currently the state-of-the-art video compression standard. It is so powerful that MPEG decided to jointly develop with ITU-T in the framework of the Joint Video Team (JVT). The new standard is called H.264 in ITU-T and is called MPEG-4 Advance Video Coding (MPEG-4 AVC), or MPEG-4 Version 10. Based on H.264, a related standard called the Audio Visual Standard (AVS) is currently under development in China. Other related standards may be under development.

H.264 has superior objective and subjective video quality over MPEG-1/2/4 and H.261/3. The basic encoding algorithm of H.264 is similar to H.263 or MPEG-4 except that integer 4×4 discrete cosine transform (DCT) is used instead of the traditional 8×8 DCT and there are additional features include intra prediction mode for I-frames, multiple block sizes and multiple reference frames for motion estimation/compensation, quarter pixel accuracy for motion estimation, in-loop deblocking filter, context adaptive binary arithmetic coding, etc.

In particular, H.264 allows the encoder to store five reference pictures for motion estimation (ME) and motion compensation (MC). However, the processing time increases linearly with the number of reference pictures used. This is because motion estimation needs to be performed for each reference frame in a simple implementation. This full selection process (the examination of all five reference frames) provides the best coding result but the five-fold increase in computation is very high.

SUMMARY OF THE INVENTION

The present invention seeks to provide new and useful multi-frame motion estimation techniques for any current frame in H.264 or MPEG-4 AVC or AVS or related video coding.

According to the present invention there is provided a method of matching a first image object (original current frame) against a number of reference image object (reference frames), including; defining regions (e.g. non-overlapping rectangular blocks, or some expanded regions similar to those in the overlapping motion compensation in H.263) in the first image object (e.g. frame N); for each region in the first image object, defining the corresponding representative coordinate (e.g. upper left corner of a block within the current frame); for each region in the first image object, defining a search region (e.g. a search window of 3×4 in frame N-1, 5×8 in frame N-2, 7×12 in frame N-3 and so on) in each of the reference image objects, with different search regions of possibly different sizes; for each region in the first image and for a relative coordinate in the search region (a location of the search block within the search window) in each of the reference image objects, defining a relative coordinate (motion vector) with respect to the representative coordinate of the said region in the first image, and a mismatch measure (e.g. SAD or MSE or some rate-distortion cost function) between the said region in the first image and the corresponding region at the said relative location in the said reference image; for each region in the first image object, computing the mismatch measure at selected relative locations in the search regions of selected reference image objects and choosing one or more relative coordinates in the search regions of the selected reference image objects; followed possibly by an optional local search at integer-pixel and sub-pixel precision around the chosen relative coordinates for each region in the first image object, constructing a motion-compensated region by considering regions (such regions may or may not be of the same size as the said region in the first image, e.g. they can be the expanded regions used in overlapped motion compensation in H.263) at the said selected relative coordinates in the said selected reference image objects and applying linear or nonlinear operations to combine them to form a motion-compensated region (this region may or may not be of the same size as the said region in the first image); combining all the said motion-compensated regions to form a second image object (predictive frame) of the same size as the first image object; and forming a third image object (residue frame) of the same size as the first image object by subtracting the second image object (predictive frame) from the first image object (original current frame).

The present invention provides for the intelligent selection of the reference image objects, and the intelligent selection of the relative coordinates. Such intelligent selection allows us to perform the mismatch calculation on a greatly reduced number of candidate reference frames and candidate relative locations (motion vectors).

In a preferred embodiment a class is defined for each region in the first image object; for each region in the first image object, a class is defined for each of the reference image objects; for each region in the first image object, the selection of the reference image objects and the selection of relative coordinates in the said reference image objects for the computation of the mismatch measure depend on the class of the said region in the first image and the classes of the said reference image objects, and after the said mismatch computation, one or more relative coordinates in the search regions of the reference image objects are chosen.

In a preferred embodiment a class is defined for each region in the first image object; for each region in the first image object, a class is defined for each of the reference image objects; for each region in the first image object, among all the reference image objects with the same or similar class, only a number of (e.g. one) image objects is selected for the computation of the mismatch measure; depending on the relationship between the class of the said region in the first image object and the class of any said selected reference image object, a number of the relative coordinates in the search area of the said selected reference image object are selected for mismatch computation. Complete or partial mismatch computations are both possible. After the said mismatch computation, one or more relative coordinates in the search regions of the reference image objects are chosen. This may be followed by an optional local search at integer-pixel or sub-pixel precision. In one version of this embodiment the selected image object within a class is the image object that is closest in time within the class (e.g. the nearest past frame with the same class).

In a preferred embodiment of the invention for each region in the first image object, a class is defined for each of the reference image objects (a class is defined for each reference frame); for each region in the first image object (e.g. frame N), a second image object (e.g. frame N-1) is defined and a class is defined for the second image object; for each region in the first image object, a class is defined for the said region according to the class of the second image object, and the relative coordinate in the search area in the second image object achieving the least mismatch measure between the first image object and the second image object; for each region in the first image object, the selection of the reference image objects and the selection of relative coordinate in the said reference image objects for the computation of the mismatch measure depends on the class of the said region in the first image and the classes of the said reference image objects; and after the said mismatch computation, one or more relative coordinates in the search regions of the reference image objects are chosen. In one version of this embodiment the second image is the immediate past image object.

In a preferred embodiment of the invention for each region in the first image object, a class is defined for each of the reference image objects; for each region in the first image object (e.g. frame N), a second image object (e.g. frame N-1) is defined and a class is defined for the second image object; a search region is defined in the second image and a number of relative coordinates in the search region are selected for mismatch computation. Complete or partial mismatch computations are both possible. For each region in the first image object, a class is defined for the said region according to the class of the second image object, and one or more of the selected relative coordinates in the search region in the second image object achieving the least mismatch measures between the first image object and the second image object. For each region in the first image object, the selection of the reference image objects and the selection of relative coordinates in the said reference image objects for the computation of the mismatch measure depends on the class of the said region in the first image and the classes of the said reference image objects. After the said mismatch computation, one or more relative coordinates in the search regions of the reference image objects are chosen. In a version of this embodiment the second image is the immediate past image object.

In a preferred embodiment of the invention for each region in the first image object, a class is defined for each of the reference image objects; for each region in the first image object (e.g. frame N), a second image object (e.g. frame N-1) is defined and a class is defined for the second image object; a search region is defined in the second image and a number of relative coordinates in the search region are selected for mismatch computation. Complete or partial mismatch computation are both possible. For each region in the first image object, a class is defined according to the class of the second image object, and one or more of the selected relative coordinates in the search region in the second image object achieving the least mismatch measures between the first image object and the second image object. For each region in the first image object, among all the reference image objects with the same class, only one image object is selected for the computation of the mismatch measure. Depending on the relationship between the class of the said region in the first image object and the class of any said selected reference image object, a number of the relative coordinates in the search area of the said selected reference image object are selected for mismatch computation. Complete or partial mismatch computations are both possible. After the said mismatch measure computation, one or more relative coordinates in the search regions of the reference image objects are chosen. In a version of this embodiment the second image is the immediate past image object. In a version of this embodiment the selected image object is the image object that is closest in time within the class (e.g. the nearest past frame with the same class).

In an embodiment of the invention a class is defined for each region in the first image object; for each region in the first image object, and for each relative coordinate in the corresponding search region in any of the reference image objects, a class is defined for the said relative coordinate; (a class is defined for each possible search point in each reference frame); for each region in the first image object, the selection of the reference image objects and the selection of relative coordinate in the said reference image objects for the computation of the mismatch measure depends on the class of the said region in the first image and the classes of the said relative coordinate in the said reference image objects. After the said mismatch computation, one or more relative coordinates in the search regions of the reference image objects are chosen.

In an embodiment of the invention for each region in the first image object, and for each relative coordinate in the corresponding search region in any of the reference image objects, a class is defined for the said relative coordinate; (a class is defined for each possible search point in each reference frame); for each region in the first image object (e.g. frame N), a second image object (e.g. frame N-1) is defined and a search region is defined in the second image object and a class is defined for all the relative coordinates in the said search region in the second image object; a number of the relative coordinates in the search region are selected for mismatch computation. Complete or partial mismatch computations are both possible. For each region in the first image object, a class is defined according to (i) one or more relative coordinates in the search region in the second image object achieving the least mismatch measures between the first image object and the second image object, and (ii) the classes of the said relative coordinates in the second image object; For each region in the first image object, the selection of the reference image objects and the selection of relative coordinate in the said reference image objects for the computation of the mismatch measure depends on the class of the said region in the first image and the classes of the said relative coordinate in the said reference image objects. In one version of this embodiment the said second image is the immediate past image object.

In an embodiment of the invention for each region in the first image object, and for each relative coordinate in the corresponding search region in any of the reference image objects, a class is defined for the said relative coordinate; (a class is defined for each possible search point in each reference frame). For each region in the first image object (e.g. frame N), a second image object (e.g. frame N-1) is defined and a search region is defined in the second image object and a class is defined for all the relative coordinates in the said search region in the second image object; for each region in the first image object, a class is defined according to (i) a number of relative coordinates in the search region in the second image object achieving the least mismatch measures between the first image object and the second image object, and (ii) the classes of the said relative coordinate in the second image object; (more than one relative coordinates used); for each region in the first image object, among all the reference image objects with the same class, only one image object is selected for the computation of the mismatch measure. Depending on the relationship between the class of the said region in the first image object and the class of any said selected reference image object, a number of the relative coordinates in the search area of the said selected reference image object are selected for mismatch computation. Complete or partial mismatch computations are both possible. After the said mismatch computation, one or more relative coordinates in the search regions of the reference image objects are chosen. In one version of this embodiment the said second image in is the immediate past image object. In one version of this embodiment the selected image object within a class is the image object that is closest in time within the class (e.g. the nearest past frame with the same class).

In some embodiments of the invention, the classification of regions can be updated or reset because classification errors can occur in some classification methods and such errors can accumulate over time. The updating or resetting can be performed periodically or when certain situations occur. In some embodiments of the invention, the class of the said region, of the said second image object and the said reference image objects are updated, after the mismatch measure computation, depending on the behavior of the computed mismatch measure. In one embodiment, the classes can be pixel-location classes such as "integer location", "half-pixel location", "quarter-pixel location, "⅛-pixel location", "¹⁄₁₆-pixel location", In this embodiment, the pixel location classification of regions in the first image object may be determined with respect to the pixel location classification of the regions in the second image object. Thus any error in the pixel location classification of the regions in the second image object can affect the accuracy of the classification in the first image object, which in turn can affect future image objects. In one embodiment, the updating or resetting can be triggered when there is a large reduction in the mismatch measure as the motion estimation changed from one pixel precision to another (e.g. full integer pixel to half-pixel motion, or from half-pixel to quarter-pixel, and so on). In one embodiment, when there is a large reduction in the mismatch measure as the motion changed from integer pixel precision to half-pixel precision, the class of the selected reference image object may be updated or reset to "integer-pixel location". In another embodiment, when there is a large reduction in the mismatch measure as the motion changed from half-pixel precision to quarter-pixel precision, the class of the selected reference image object may be updated or reset to "half-pixel location" and similarly when there is a large reduction in the mismatch measure as the motion changed from quarter-pixel to ⅛-pixel or ⅛-pixel to ¹⁄₁₆ pixel, the selected reference image object may be updated or reset to quarter-pixel or ⅛ pixel respectively.

Viewed from another aspect the present invention provides an overall multi-frame motion estimation method such that single-frame motion estimation is performed with respect to the most recent reference frame; if best distortion is smaller than a threshold, the search terminates; otherwise, single-frame motion estimation is performed on other reference frames in such a way that only one frame from the same pixel-location class is examine, the one being the most recent frame. In the single-frame motion estimation, full search or fast search can be applied. In other words, complete or partial mismatch computations are both possible.

In the above embodiments of the invention, the classes may be defined according to the pixel location, with classes such as "integer location", "half-pixel location", "quarter-pixel location", "⅛-pixel location", "¹⁄₁₆-pixel location", etc. The classes may also be defined according to the type of regions (e.g. "smooth", "edge", "texture" etc), orientation of edges (e.g. "vertical edge", "horizontal edge", and edges with various angle of orientation or inclination, etc), width of the edges (e.g. "1-pixel wide edge", "2-pixel wide edge", etc), etc, or even a combination of various attributes. Some of these classifications of the first image object may require a second image object, while others do not.

The embodiments of the invention given above are in terms of the current H.264 setting. While H.264 allows 5 reference frames, actually any amount of reference frames can be used. This invention can be applied with multiple block size, and the blocks do not necessarily be non-overlapping. The reference frames may be in the past or in the future. While only one of the reference frames is used in the above description, more than one frames can be used (e.g. a linear combination of several reference frames). While H.264 uses discrete cosine transform, any discrete transform can be applied. Actually, the use of "pixel location" classes in the decision of which reference frames to use, or not to use, can be extended to other decisions. The classification of situations according to "pixel location" due to horizontal and vertical translational motion can be generalized to classes due to translational and rotational motion in all possible directions. It can also be generalized to classes due to rigid or non-rigid objects at different spatial location, orientation and scale. While video is a sequence of "frames" which are 2-dimensional pictures of the world, the invention can be applied to sequences of lower (e.g. 1) or higher (e.g. 3) dimensional description of the world.

For the video, one picture element (pixel) may have one or more components such as the luminance component, the red, green, blue (RGB) components, the YUV components, the YCrCb components, the infra-red components, the X-ray or other components. Each component of a picture element is a symbol that can be represented as a number, which may be a natural number, an integer, a real number or even a complex number. In the case of natural numbers, they may be 12-bit, 8-bit, or any other bit resolution. While the pixels in video are 2-dimensional samples with rectangular sampling grid and uniform sampling period, the sampling grid does not need to be rectangular and the sampling period does not need to be uniform.

Moreover, the present invention in any of its aspect is applicable not only to the encoding of video, but also to the correspondence estimation in the encoding of audio signals, speech signals, video signals, seismic signals, medical signals, etc.

BRIEF DESCRIPTION OF THE DRAWINGS

Embodiments of the invention will now be described for the sake of example only with reference to the following figures, in which.

DETAILED DESCRIPTION OF THE INVENTION

The present invention, at least in its preferred embodiments, provides a novel fast multi-frame selection scheme that requires significantly reduced computational cost while achieving similar visual quality and bit-rate as the full selection process. Instead of searching through all the possible reference frames, the proposed scheme tries to select only a few representative frames for motion estimation. This is very useful for real-time applications.

Accurate prediction can efficiently reduce the degree of error between the original image and the predicted image. For this reason, quarter-pixel translational motion estimation/compensation is adopted in H.264 for better compression performance. Between two consecutive frames, the object motion may be an integer pixel motion, a half-pixel motion, or a quarter-pixel motion, ⅛-pixel motion, 1/16-pixel motion etc. Typically, sub-pixel motion estimation algorithms use interpolation to predict the sub-pixel shift of texture relative to the sampling grid.

Suppose an object has edges aligned perfectly with the sensor boundaries at a particular time instant such that the object edge is clear and sharp. We will describe this object as having "integer-pixel location". When the object undergoes an integer-pixel translational motion, the object will look exactly the same in the two consecutive frames except that one is a translation to another. And the moved object can be predicted perfectly by integer-pixel motion estimation.

Figure 1A:
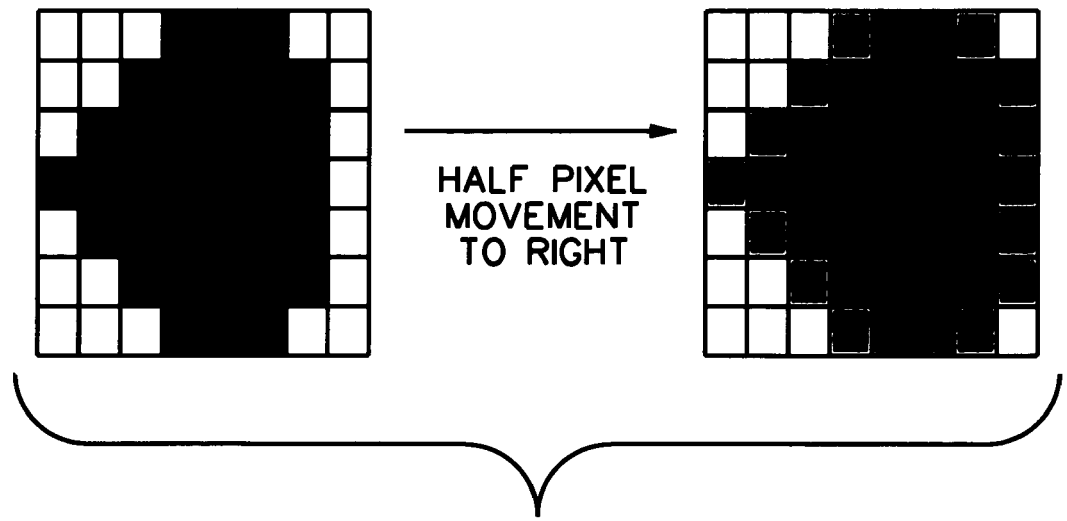
FIG. 1 illustrates examples of half-pixel motion and quarter-pixel motion

When the object 100 undergoes a half-pixel motion, the edges may be blurred as shown in FIG. 1a. We will describe this object as having "half-pixel location". The original zero-pixel-wide (sharp) object edge now becomes one pixel-wide (blurred). The pixel at the blurred object edges 106 may have only half the intensity of the original object, which can lead to difficulty in motion estimation. In particular, the block on the right 102 in FIG. 1a can be predicted perfectly by block 100 using half-pixel motion estimation. However, block 100 cannot be predicted perfectly by block 102.

Figure 1B:
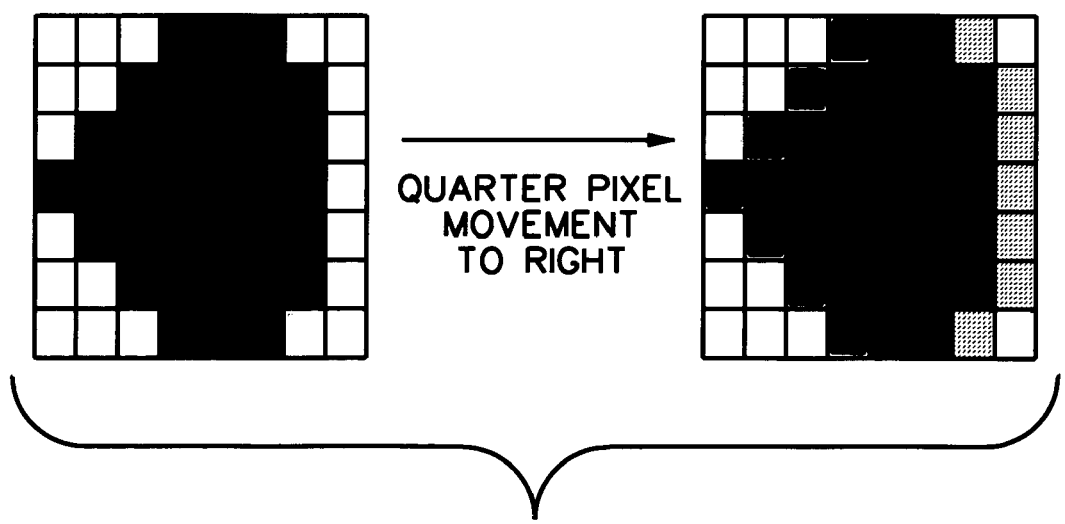

Similarly, when the object 100 undergoes a quarter-pixel motion, the edges may be blurred as shown in FIG. 1b. We will describe this object as having "quarter-pixel location". The zero-pixel-wide (sharp) object edge becomes one-pixel-wide (blurred). The pixels at the blurred edges may have ¾ (108) or ¼ (110) of the intensity. Again, the blurred "quarter-pixel location" object 104 can be predicted perfectly from the sharp "integer-pixel location" object 100 using quarter-pixel motion estimation, but not vice versa.

In general, the objects can be classified into sub-pixel location classes, namely "integer-pixel location", "half-pixel location" and "quarter-pixel location". The edge (and probably texture) details in the three classes are different.

The advantage of multi-frame ME is that it can further reduce the temporal redundancy in the video sequences by considering more than one reference frames. The best match is usually found by minimizing the cost function:

$$J(m, \lambda_{MOTION}) = SAD(s, c(m)) + \lambda_{MOTION} \cdot R(m-p) \quad (1)$$

with $m=(m_x, m_y)^T$ being the motion vector, $p=(p_x, p_y)^T$ being the prediction for the motion vector and $\lambda_{MOTION}$ being the Lagrange multiplier. The term $R(m-p)$ represents the bits used to encode the motion information and are obtained by table-lookup. The SAD (Sum of Absolute Differences) is computed as:

$$SAD(s, c(m)) = \sum_{x=1, y=1}^{B,B} |s[x, y] - c[x - m_x, y - m_y]| \quad (2)$$

with B=16, 8 or 4 and s being the original video signal and c being the coded video signal.

There are basically two types of temporal redundancy that can be captured by using multiple reference frames but not the traditional single frames. The first type of redundancy is related to short-term memory. Suppose the current frame is frame t. Sometimes, objects may be distorted or absent in frame t-1, but well represented in frames t-2 to t-5. An example is the blinking of an eye, which is a very fast motion. If multiple reference frames are allowed, the motion estimation and compensation can be significantly better than just a single reference frame. However, in our experiments, we observe that the previous reference frame (i.e. frame t-1) still has the highest probability of being selected among the five possible reference frames.

The second type is the sub-pixel movement of textures described above. Textures and objects with different version of "sub-pixel locations" ("integer-pixel", "half-pixel" and "quarter-pixel") may occur in successive video frames. In our experiments, we observe that there is a great tendency for the cost function to be especially small when the same shifted version of texture is used to do the motion estimation and compensation. In other words, the optimal reference frame tends to be the one with the same sub-pixel location as the current frame.

The more reference frames used, the higher the probability for the current image to find a reference frame with the same sub-pixel location. Probably this is the reason why it has been suggested that sub-pixel motion compensation is more important in single-frame ME/MC than in multi-frame ME/MC. Nevertheless, multi-frame motion estimation together with sub-pixel accuracy motion estimation is a strong combination to tackle the sub-pixel movement of texture and edges. However, it is difficult to determine accurately the current sub-pixel location class a priori.

We also observe that when there is more than one frame with the same sub-pixel location, the one closer to the current frame is usually better. As a result, the motion estimation speed can be increased by estimating the type of shifted version of texture ("sub-pixel location") in the frame buffer. For example in FIG. 2, the black square means collocated macroblocks in Frame t and the multiple reference frames. So if the macroblock at Frame t-1 and Frame t-2 show the same shifting characteristics, then we can drop the redundant one (Frame t-2) and reduce motion estimation complexity.

Figure 2:
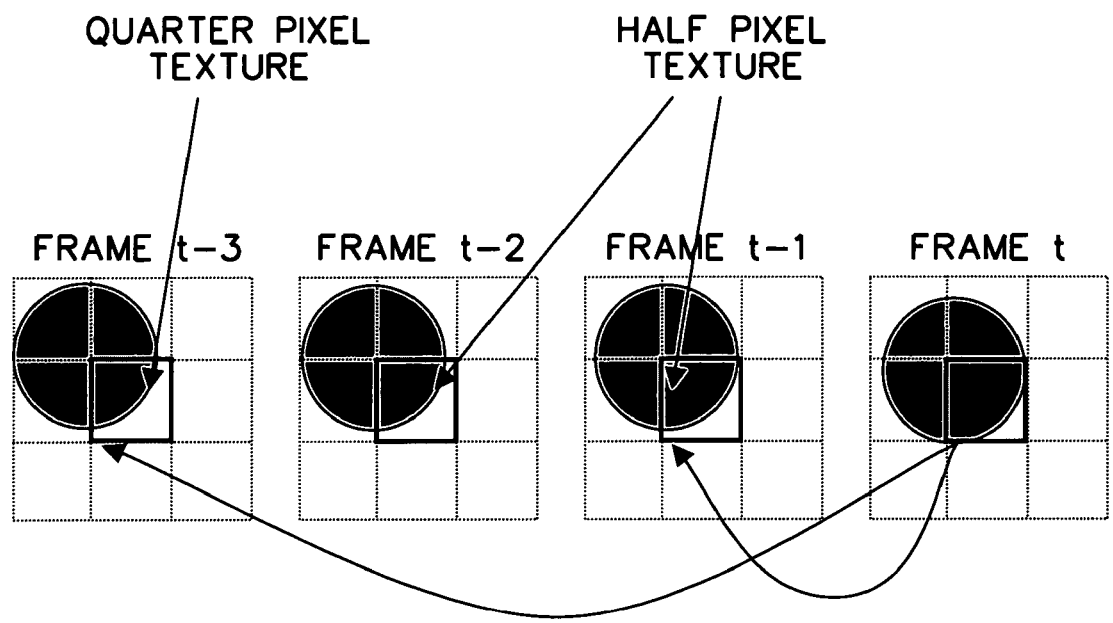
FIG. 2 shows an example of selection of frames t-1, t-2, t-3 for motion estimation of frame t.

Suppose we need to perform multi-frame motion estimation for frame t, as shown in FIG. 2. In the proposed fast multi-frame motion estimation (FMFME) algorithm, each macroblock (e.g., macroblock 200) in the reference frames (frames t-5 to t-1) is assumed to have a sub-pixel location.

Before performing motion estimation for the current macroblock (with black frame) in frame t (202), the motion vectors of all the collocated macroblocks in frames t-1 to t-5 will be examined. If two or more macroblocks have the same sub-pixel location, only one frame is enabled for motion estimation. The sub-pixel location of two macroblocks are considered the same if both the x and y components of the sub-pixel location are equal. The process will enable the frame with smallest temporal distance (closest) to the current frame.

Motion estimation is then performed on the immediate past frame (i.e. frame t-1 (204)), as this is the most likely frame to be the best. After the motion estimation process, the sub-pixel motion vectors obtained are added to the sub-pixel locations of the "dominant" reference macroblocks (with maximum overlapping area) to obtain the sub-pixel location of the current macroblock. So for FIG. 2 if we assume frame t-3 (206) is chosen to be the reference frame for the black (current) macroblock in frame t, the sub-pixel location of the current macroblock in frame t is obtained by adding its sub-pixel motion vector to the sub-pixel position of black macroblock in frame t-3.

Several early termination checks are then performed. If the best SAD with respect to frame t-1 is smaller than a threshold $T_1$, we consider it "good enough" and would skip the motion estimation for other reference frames. If the current macroblock is sufficiently flat such that there is no strong texture inside the macroblock, we would also skip the multi-frame motion estimation because multi-frame motion estimation in such cases tends to have little performance gain over single-frame motion estimation. To determine the flatness of the macroblock, 4×4 Hadamard transform is performed for every 4×4 sub-block inside the macroblock. If all the AC coefficients of the 4×4 sub-blocks are equal to zero, we would consider the macroblock is sufficiently flat. Otherwise, motion estimation is performed on the enabled reference frames.

There is also a sub-pixel location refreshing mechanism. Our sub-pixel location estimation of the macroblocks may not be 100% accurate, especially with potential error drifting over many frames. The accumulation of error can affect the performance of FMFME. Therefore, refreshing of sub-pixel location is necessary. We observe in our experiments that, for texture at integer-pixel, half-pixel or quarter-pixel locations, only the textures at integer-pixel location can give a large SAD reduction when it is interpolated/filtered into half pixel type texture for half-pixel motion estimation. When this occurs, we reset the sub-pixel location of the reference macroblock to be integer-pixel, and update the current sub-pixel location if appropriate. This refreshing can help to suppress the propagation of error.

Figure 3:
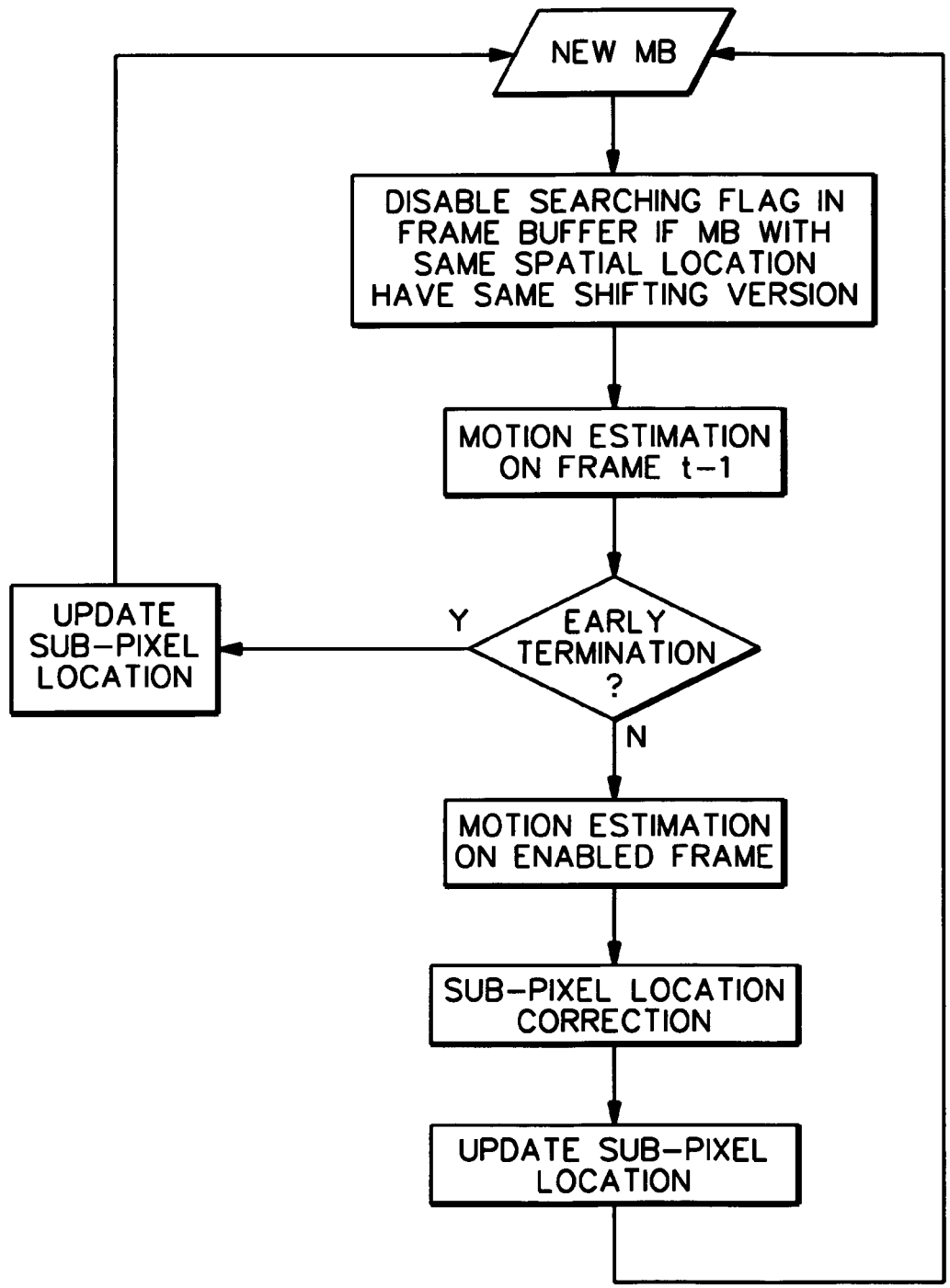
FIG. 3 shows the flow chart of the proposed method FMFME.

Here is how our refreshing mechanism works. During the motion estimation between the current and reference frame, the best SAD obtained using integer-pixel and half-pixel motion estimation is compared. If the half-pixel ME gives 50% reduction in SAD compared with the integer-pixel ME, the sub-pixel location type of the reference macroblock will be updated to be of integer-pixel. FIG. 3 shows the flow chart 300 of the proposed algorithm.

Experimental Results

The proposed FMFME was tested on four QCIF (176×144) sequences, "Akiyo", "Coastguard", "Stefan" and "Foreman", with constant quantization factor, Qp=16 and $T_1$=512. The proposed scheme was implemented in the H.264 reference software TML9.0. PMVFAST was used for fast motion estimation.

Figure 4:
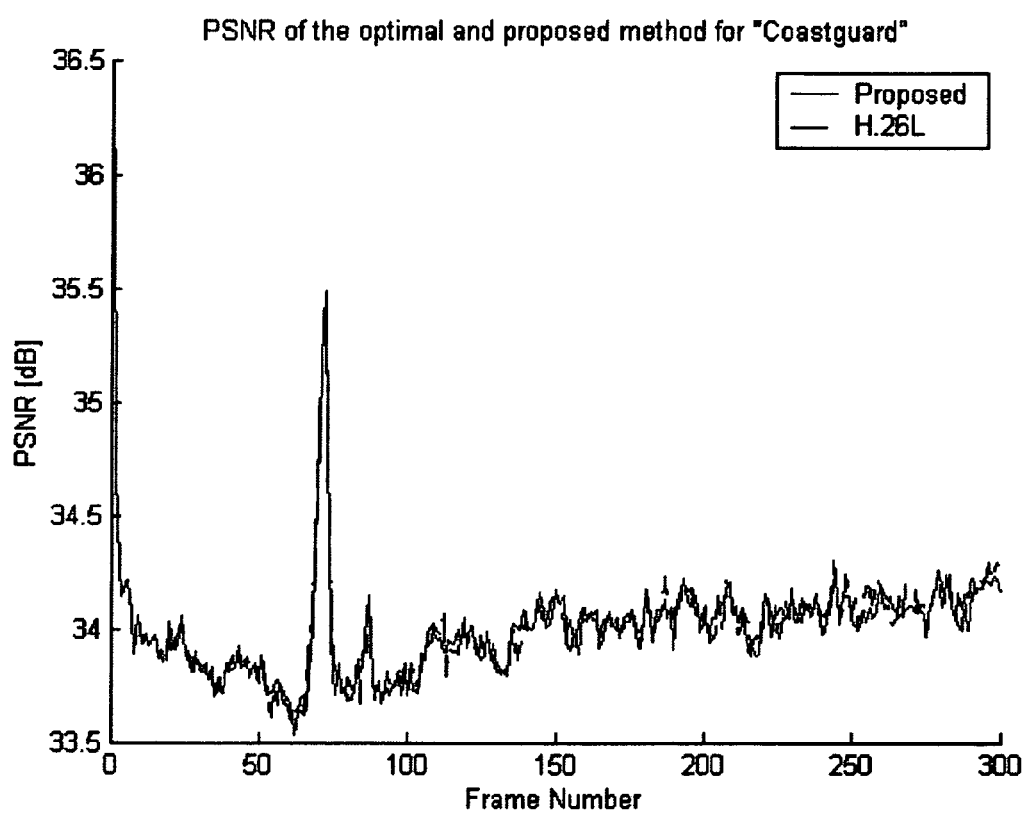
FIG. 4 shows the PSNR comparison between full search and the proposed FMFME for a test sequence called "Coastguard".

Table 1 below gives the results of PSNR (peak signal-to-reconstructed image measure), bit rate and complexity reduction of the proposed FMFME in the testing sequences. The computational cost using a powerful performance analyzer in term of number of clock cycles is used. Compared with the full search (FS) multi-frame selection scheme in H.264, the proposed FMFME can reduce computational cost by 53% (equivalent complexity of performing PMVFAST on 2.6 frames instead of 5 reference frames) with negligibly small PSNR degradation (0.02 dB) and fewer bits (0.10%) on the average. FIG. 4 shows a graph 400 the PSNR comparison for "Coastguard".

TABLE 1

Comparison of PSNR, bitrate and complexity for H.264 and proposed FMFME algorithm

|  | Complexity | PSNR(dB) | Bitrate |
|---|---|---|---|
| Coastguard | | | |
| H.264 (FS) | $120.66 \times 10^9$ | 34.01 | 2472144 |
| FMFME | $64.92 \times 10^9$ | 34.00 | 2476936 |
| Saving | 46.2% | −0.01 | −0.19% |
| Akiyo | | | |
| H.264 (FS) | $102.43 \times 10^9$ | 38.23 | 287336 |
| FMFME | $28.73 \times 10^9$ | 38.23 | 287024 |
| Saving | 72% | 0.00 | 1.1% |
| Stefan | | | |
| H.264 (FS) | $122.98 \times 10^9$ | 34.01 | 4814040 |
| FMFME | $71.32 \times 10^9$ | 33.99 | 4838168 |
| Saving | 42% | −0.02 | −0.5% |
| Foreman | | | |
| H.264 (FS) | $126.77 \times 10^9$ | 35.65 | 1604520 |
| FMFME | $71.35 \times 10^9$ | 35.60 | 1617704 |
| Saving | 43.64% | −0.05 | −0.82% |

The fast motion estimation process of embodiments of the present invention is mainly targeted for fast, low-delay and low cost software and hardware implementation of H.264, or MPEG4 AVC, or AVS, or related video coding standards or methods. Possible applications include digital cameras, digital camcorders, digital video recorders, set-top boxes, personal digital assistants (PDA), multimedia-enabled cellular phones (2.5 G, 3 G, and beyond), video conferencing systems, video-on-demand systems, wireless LAN devices, bluetooth applications, web servers, video streaming server in low or high bandwidth applications, video transcoders (converter from one format to another), and other visual communication systems, etc.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of matching a first image object against a plurality of reference image objects, the method comprising:

defining a plurality of regions in the first image object;

defining a class for at least one of the regions in the first image object; for the regions in the first image object, defining a corresponding representative coordinate;

for the regions in the first image object, defining corresponding search regions in the reference image objects, with different search regions of different sizes;

for at least one region in the first image object and for a coordinate in the search region in at least one of the reference image objects, defining a relative coordinate with respect to the representative coordinate of the region in the first image object, and a mismatch measure between the region in the first image object and the corresponding region at the relative coordinate in the reference image object;

for at least one region in the first image object, selecting a number of reference frames and selecting a number of relative coordinates in the search region in the selected reference frames;

for at least one region in the first image object, computing the mismatch measure at selected relative coordinates in the search regions of selected reference image objects and choosing one or more relative coordinates in the search regions of the reference image objects;

wherein for at least one region in the first image object, computing the mismatch measure depends at least in part on the class of the region in the first image object;

for at least one of the chosen relative coordinates for at least one region in the first image object, selecting a collection of neighboring integer-pixel and sub-pixel relative coordinates around the chosen relative coordinate, and computing the mismatch measure at the selected neighboring relative coordinates, interpolating pixel values at sub-pixel relative coordinates; and for at least one region in the first image object, constructing a motion-compensated region by considering regions at the chosen selected relative coordinates in the selected reference image objects and applying linear or nonlinear operations to combine them to form a motion-compensated region.

2. The method of claim 1, wherein:

for at least one region in the first image object, a class is defined for at least one of the reference image objects;

for at least one region in the first image object, of said computing the mismatch measure further depends on the classes of the reference image objects;

after said computing the mismatch measure, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the selected reference image objects, and the result of said computing the mismatch measure at the selected relative coordinates in the selected reference image objects.

3. The method of claim 1, wherein:

for at least one region in the first image object, a class is defined for at least one relative coordinate of the reference image objects;

for at least one region in the first image object, said computing the mismatch measure further depends on the classes of the reference image objects;

after said computing the mismatch measure, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the selected reference image objects, and the result of said computing mismatch measure at the selected relative coordinates in the selected reference image objects.

4. The method of claim 1, wherein:

for at least one region in the first image object, a class is defined for at least one of the reference image objects;

for at least one region in the first image object, among all the reference image objects with the same class, only one of the reference image objects is selected for said computing the mismatch measure;

depending on the relationship between the class of the region in the first image object and the class of any said selected reference image object, a number of the relative coordinates in the search area of the selected reference image object are selected for said computing the mismatch measure; and after said computing the mismatch measure, one or more selected relative coordinates in the search regions of the selected reference image objects are chosen.

5. The method of claim 4, wherein the only one reference image object selected for said computing the mismatch measure is the image object that is closest in time within the class.

6. The method of claim 1, wherein:

for at least one region in the first image object, a class is defined for at least one of the reference image objects;

for at least one region in the first image object, a second image object is defined and a class is defined for the second image object;

for at least one region in the first image object, a class is defined according to the class of the second image object, and the relative coordinate in the search area in the second image object achieving the least mismatch measure between the first image object and the second image object;

for at least one region in the first image object, said computing the mismatch measure further depends on the classes of the reference image objects;

after said computing the mismatch measure, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the selected reference image objects, and the result of said computing the mismatch measure at the selected relative coordinates in the selected reference image objects.

7. The method of claim 6, wherein the second image object is an immediate past image object.

8. The method of claim 1, wherein:

for at least one region in the first image object, a class is defined for at least one of the reference image objects;

for at least one region in the first image object, a second image object is defined and a class is defined for the second image object;

a search region is defined in the second image and a number of relative coordinates in the search region are selected for said computing the mismatch measure;

for at least one region in the first image object, a class is defined for the region according to the class of the second image object, and one or more of the selected relative coordinates in the search region in the second image object achieving least mismatch measures between the first image object and the second image object;

for at least one region in the first image object, said computing the mismatch measure further depends on the classes of the reference image objects;

after said computing the mismatch measure, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the selected reference image objects, and the results of said computing the mismatch measure at the selected relative coordinates in the selected reference image objects.

9. The method of claim 8, wherein the second image is an immediate past image object.

10. The method of claim 1, wherein:
for at least one region in the first image object, a class is defined for at least one of the reference image objects;

for at least one region in the first image object, a second image object is defined and a class is defined for the second image object;

a search region is defined in the second image and a number of selected relative coordinates in the search region are selected for said computing the mismatch measure;

for at least one region in the first image object, a class is defined according to the class of the second image object, and one or more of the selected relative coordinates in the search region in the second image object achieving least mismatch measures between the first image object and the second image object;

for at least one region in the first image object, among all the selected reference image objects with the same class, only one of the reference image objects is selected for said computing the mismatch measure at the selected relative coordinates in the search regions of selected reference image objects;

depending on the relationship between the class of the region in the first image object and the class of any said selected reference image object, a number of the relative coordinates in the search area of the selected reference image object are selected for said computing the mismatch measure;

for at least one region in the first image object, the selection of the neighboring relative coordinates around the chosen relative coordinates for said computing the mismatch measure depends on the class of the region in the first image, the classes of the selected reference image objects, and the result of said computing the mismatch measure at the selected relative coordinates in the selected reference image objects;

after the mismatch measure computation, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the selected reference image objects, and the result of said computing the mismatch measure at the selected relative coordinates in the selected reference image objects.

11. The method of claim 10, wherein the second image is an immediate past image object.

12. The method of claim 10, wherein the selected image object within a class is the image object that is closest in time within the class.

13. The method of claim 2, wherein the classes of regions are defined according to a number of image and video features.

14. The method of claim 13, wherein the image or video features include pixel locations, types of regions, and width of edges.

15. The method of claim 2, wherein the classes of the regions in the first image object are defined according to image feature locations.

16. The method of claim 15, wherein the image feature locations include integer location, half-pixel location, quarter-pixel location, ⅛-pixel location, ¹⁄₁₆-pixel location.

17. The method of claim 2, wherein the classes of the regions in the first image object are defined according to type of regions.

18. The method of claim 17, wherein the type of regions include smooth, edge, texture region.

19. The method of claim 2, wherein the classes of the regions in the first image object are defined according to orientation of edges.

20. The method of claim 19, wherein the orientation of edges includes vertical edge, horizontal edge, edge with various angle of inclination.

21. The method of claim 2, wherein the classes of the regions in the first image object are defined according to width of edges.

22. The method of claim 21, wherein the width of edges include 1-pixel-wide edge, 2-pixel-wide edge.

23. The method of claim 2, in which the class of the reference image objects is determined by choosing a dominant class which has a highest occurrence among all the regions within at least one of the reference image objects.

24. The method of claim 1, wherein:
at least one for at least one region in the first image object, and for at least one relative coordinate in the corresponding search region in any of the reference image objects, a class is defined for the relative coordinate;

for at least one region in the first image object said computing the mismatch measure further depends on the classes of the relative coordinate in the reference image objects;

after said computing the mismatch measure, one or more selected relative coordinates in the search regions of the selected reference image objects are chosen; and for at least one region in the first image object, the selection of the neighboring relative coordinates around the chosen relative coordinates for said computing the mismatch measure depends on the class of the region in the first image, the classes of the relative coordinates in the selected reference image objects, and the result of said computing the mismatch measure at the selected relative coordinates in the selected reference image objects.

25. The method of claim 1, wherein:
for at least one region in the first image object, and for at least one relative coordinate in the corresponding search region in any of the reference image objects, a class is defined for the relative coordinates;

for at least one region in the first image object, said computing the mismatch measure further depends on the classes of the relative coordinates in the reference image objects;

depending on the relationship between the class of the region in the first image object and the class of any said selected reference image object, a number of the relative coordinates in the search area of the selected reference image object are selected for said computing the mismatch measure; and after said computing the mismatch measure, one or more selected relative coordinates in the search regions of the selected reference image objects are chosen.

26. The method of claim 3, wherein the selected image object within a class is the image object that is closest in time within the class.

27. The method of claim 1, wherein:

for at least one region in the first image object, and for at least one relative coordinate in the corresponding search region in any of the reference image objects, a class is defined for the relative coordinate;

for at least one region in the first image object, a second image object is defined and a search region is defined in the second image object and a class is defined for all the relative coordinates in the search region in the second image object;

a number of the relative coordinates in the search region are selected for said computing the mismatch measure;

for at least one region in the first image object, a class is defined according to (i) one or more relative coordinates in the search region in the second image object achieving the least mismatch measures between the first image object and the second image object, and (ii) the classes of the relative coordinates in the second image object;

for at least one region in the first image object, said computing the mismatch measure further depends on the classes of the relative coordinate in the reference image objects;

after said computing the mismatch measure, one or more selected relative coordinates in the search regions of the selected reference image objects are chosen;

for at least one region in the first image object, the selection of the neighboring relative coordinates around the chosen relative coordinates for said computing the mismatch measure depends on the class of the region in the first image, the classes of the relative coordinates in the selected reference image objects, and the result of said computing the mismatch measure at the selected relative coordinates in the selected reference image objects; and for at least one region in the first image object, the selection of the neighboring relative coordinates around the chosen relative coordinates for said computing the mismatch measure depends on the class of the region in the first image, the classes of the relative coordinates in the selected reference image objects, and the result of said computing the mismatch measure at the selected relative coordinates in the selected reference image objects.

28. The method of claim 27, wherein the second image is an immediate past image object.

29. The method of claim 1, wherein:

for at least one region in the first image object, and for at least one relative coordinate in the corresponding search region in any of the reference image objects, a class is defined for the relative coordinate;

for at least one region in the first image object, a second image object is defined and a search region is defined in the second image object and a class is defined for at least one of the relative coordinates in the search region in the second image object;

for at least one region in the first image object, a class is defined according to (i) a number of relative coordinates in the search region in the second image object achieving the least mismatch measures between the first image object and the second image object, and (ii) the classes of the relative coordinate in the second image object;

for at least one region in the first image object, among all the reference image objects within the same class, only one of the reference image objects is selected for said computing the mismatch measure depending on the relationship between the class of the region in the first image object and the class of any said selected reference image object, a number of the relative coordinates in the search area of the only one of the selected reference image object are selected for said computing the mismatch measure; and after said computing the mismatch measure, one or more relative coordinates in the search regions of the reference image objects are chosen.

30. The method of claim 29, wherein the second image object is an immediate past image object.

31. The method of claim 29, wherein the only one image object is the image object that is closest in time within the class.

32. The method of claim 24, wherein the classes of the regions in the first image object are defined according to image feature locations.

33. The method of claim 32, wherein the image feature locations include integer location, half-pixel location, quarter-pixel location, ⅛-pixel location, 1/16-pixel location.

34. The method of claim 24, wherein the classes of the regions in the first image object are defined according to type of regions.

35. The method of claim 34, wherein the type of regions include smooth, edge, texture region.

36. The method of claim 24, wherein the classes of the regions in the first image object are defined according to orientation of edges.

37. The method of claim 36, wherein the orientation of edges includes vertical edge, horizontal edge, edge with various angle of inclination.

38. The method of claim 24, wherein the classes of the regions in the first image object are defined according to width of edges.

39. The method of claim 38, wherein the width of edges include 1-pixel-wide edge, 2-pixel-wide edge.

40. The method of claim 24, wherein the classes of regions in the first image object are defined according to a number of image and video features.

41. The method of claim 2, wherein:

for at least one region in the first image object, classes are defined for the second image object and the reference image objects;

mismatch measure is computed between the region and the corresponding regions at the selected relative coordinates in the selected reference images; and the classes of the region, of the second image object and the reference image objects are updated, periodically or if certain situations occur.

42. The method of claim 2, wherein:

for at least one region in the first image object, classes are defined for the second image object and the reference image objects;

the mismatch measure is computed between the region and the corresponding regions at the selected relative coordinates in the selected reference images; and the class of the region, of the second image object and the reference image objects are updated, after the mismatch measure computation, depending on behavior of the computed mismatch measure.

43. The method of claim 39, wherein:

the classes are selected from integer location, half-pixel location, quarter-pixel location, $\frac{1}{8}$-pixel location, $\frac{1}{16}$-pixel location;

if the mismatch measure is reduced to a pre-determined level as the motion estimation changes from integer-pixel precision to half-pixel precision, the class of the selected reference image object is changed to "integer-pixel location", and the classes of the region in the first image object and the reference image objects are changed accordingly;

otherwise, if the mismatch measure is reduced to a pre-determined level as the motion estimation changes from half-pixel precision to quarter-pixel precision, the class of the selected reference image object is changed to "half pixel location", and the classes of the region in the first image object and the reference image objects are changed accordingly;

otherwise, if the mismatch measure is reduced to a pre-determined level as the motion estimation changes from quarter-pixel precision to $\frac{1}{8}$-pixel precision, the class of the selected reference image object is changed to "quarter-pixel location", and the classes of the region in the first image object and the reference image objects are changed accordingly.

44. The method of claim 1, further comprising:

determining distortion between the first image object and one of the reference image objects and terminating execution of the method if the distortion is smaller than a pre-determined threshold value; and determining AC coefficients of the regions in the first image object and terminating execution of the method if the AC coefficients are equal to zero.

45. The method of claim 1, wherein:

for at least one region in the first image object and for at least one relative coordinate in the corresponding search region in any of the reference image objects, a class is defined for the relative coordinate;

for at least one region in the first image object, said computing the mismatch measure further depends on the classes of the relative coordinate in the reference image objects;

depending on the relationship between the class of the region in the first image object and the class of any said selected reference image object, a number of the relative coordinates in the search area of the selected reference image object are selected for said computing the mismatch measure; and after said computing the mismatch measure, one or more selected relative coordinates in the search regions of the selected reference image objects are chosen.

46. A computer readable medium carrying a software product for carrying out the method of claim 1.

47. A computer readable medium carrying a computer program for carrying out a method that comprises:

performing a search that includes a single-frame motion estimation with respect to a most recent reference frame;

terminating the search if a distortion is smaller than a threshold; and performing the estimation on at least one other reference frame in such a way that only one reference frame from a same pixel-location class is examined, the one reference frame being the most recent reference frame, wherein determination of said distortion depends at least in part on said pixel-location class, and wherein the search includes one of a full search or a fast search.

48. A computer readable medium carrying a software product for carrying out the method of claim 44.

49. The method of claim 1, further comprising:

combining all the motion-compensated regions to form a second image object of same size as the first image object; and forming a third image object of same size as the first image object by subtracting the second image object from the first image object.

50. The method of claim 49, wherein:

for at least one region in the first image object, classes are defined for the second image object and the reference image objects;

the mismatch measure is computed between the region and the corresponding regions at the selected relative coordinates in the selected reference images; and the classes of said region of the second image object and the reference image objects are updated.

51. A computer readable medium carrying a computer program for carrying out the method of any one of claims 2-43, 45 or 50.

* * * * *

UNITED STATES PATENT AND TRADEMARK OFFICE
CERTIFICATE OF CORRECTION

PATENT NO. : 7,720,148 B2 Page 1 of 1
APPLICATION NO. : 11/090373
DATED : May 18, 2010
INVENTOR(S) : Oscar Chi-Lim Au and Andy Chang It is certified that error appears in the above-identified patent and that said Letters Patent is hereby corrected as shown below:

Column 11, line 50, "object, of said" should read --object, said--.

Signed and Sealed this

Twenty-fourth Day of August, 2010

David J. Kappos
*Director of the United States Patent and Trademark Office*